United States Patent [19]
Yiu

[11] Patent Number: 6,044,110
[45] Date of Patent: Mar. 28, 2000

[54] METHOD AND APPARATUS FOR TRANSMISSION LINE EQUALIZATION

[75] Inventor: Lee-Chung Yiu, Fremont, Calif.

[73] Assignee: LSI Logic Corporation, Milpitas, Calif.

[21] Appl. No.: 08/699,031

[22] Filed: Aug. 15, 1996

[51] Int. Cl.[7] ................................................. H03H 7/30
[52] U.S. Cl. ...................................... 375/229; 333/28 R
[58] Field of Search .................................. 375/229, 259, 375/295, 257; 333/18, 28 R; 327/551

[56] References Cited

U.S. PATENT DOCUMENTS

| | | | |
|---|---|---|---|
| 3,568,100 | 3/1971 | Tarbos | 330/18 |
| 3,569,869 | 3/1971 | Sutton, Jr. | 333/28 R |
| 4,123,625 | 10/1978 | Chow | 375/229 |
| 4,314,288 | 2/1982 | Gyi | 360/65 |
| 4,707,840 | 11/1987 | Nakayama | 375/232 |
| 4,754,169 | 6/1988 | Morris | 327/307 |
| 4,875,112 | 10/1989 | Dost et al. | 360/65 |
| 5,153,875 | 10/1992 | Takatori | 370/32.1 |
| 5,181,228 | 1/1993 | Takatori | 375/103 |
| 5,264,785 | 11/1993 | Greason | 327/350 |
| 5,300,834 | 4/1994 | Bret | 327/581 |
| 5,559,448 | 9/1996 | Koenig | 326/30 |
| 5,719,856 | 2/1998 | May | 370/282 |

OTHER PUBLICATIONS

Clause 23 "Physical coding sublayer (PCS), physical medium attachment sublayer (PMA) and baseband medium, type 100BASE-T4", Supplement to IEEE Std. 802.3 100BASE-T, IEEE 802.3u, Jun. 12, 1995, pp. 59–138.

"10/100 Base–T4 Fast–Φ™ Transceiver", BCM5000–SP9 (Broadcom Corporation), Apr. 2, 1996, pp. 1–38.

"100Base–T4/10BASE–T Fast Ethernet Transceiver (CAT3)", Doc. No. 38–00415 (Cypress–CY7C971), pp. 7–42 to 7–65.

"10Mbps/100Mbps Lan Physical Layer Interface", (Intel–82553), pp. 1–60.

"100BASE–T Specification", Presentation Reprints from IEEE 802.3 High–Speed Study Group, Fast Ethernet Alliance, Mar. 7, 1994.

Primary Examiner—Tesfaldet Bocure

[57] ABSTRACT

A method and apparatus for equalizing the frequency response of a transmission line is provided. The method includes the steps of modelling the frequency response of the transmission media for a predetermined frequency range to a predetermined accuracy; determining a desired equalizer response by taking an inverse of the modelled frequency response of the first step; implementing an equalizer that exhibits the desired response; and utilizing the equalizer to equalize the frequency response of the transmission line. The apparatus includes an adaptive equalizer circuit which includes a plurality of signal processor circuits which each take an input signal from the transmission line and process it to mimic a term in a transfer function which represents an inverse of the transfer function of the transmission line. The signals from these processors are then summed and multiplied by a programmable gain term. Then the input is added to the output of the multiplier to form an output equalizer signal. The programmable gain term is adapted to cause the signal at the output to closely approximate a predetermined high frequency signal peak value through a send loop mechanism.

17 Claims, 7 Drawing Sheets

METHOD AND APPARATUS FOR TRANSMISSION LINE EQUALIZATION

BACKGROUND OF THE INVENTION

1. Field of the Invention

This invention relates to the field of data communications systems. More specifically, it relates to the field of wired communications systems. Even more specifically, it relates to a method and apparatus for providing compensation or equalization for the frequency response of a transmission line.

2. The Prior Art

At some point in any data communications system, the signal to be communicated passes through an electrical conductor. This electrical conductor can take many forms such as, for example, a coaxial cable ("coax"), an unshielded twisted pair cable ("UTP"), or a shielded twisted pair cable ("STP"). Such conductors are known generally as transmission media or transmission lines. Most transmission lines such as these exhibit a low pass characteristic. That is, they transmit low frequency components of the signal more readily than high frequency components of the signal, i.e., their frequency response is not "flat".

Most communications signals consist of symbols that represent the information to be communicated. These symbols are usually packed close to one another in the time domain in order to achieve the highest transmission speeds. However, when a signal such as this is passed through a transmission line having other than a flat frequency response, the low pass characteristic of the transmission line has the effect of widening each symbol in time. This widening can result in spill over or inter-symbol interference among the symbols of the signal. This in turn can result in the loss of, or incorrect communication of information.

To compensate for the low pass characteristic of a transmission line, the signal is typically passed through a transmission line equalizer at the receiver end of the transmission line. The transmission line equalizer exhibits a high pass characteristic. That is, it transmits high frequency components of the signal more readily than the low frequency components of the signal and therefore exhibits an inverse frequency response to that of the transmission line. When put in series with the low pass frequency response of the transmission line, the high pass frequency response of the transmission line equalizer has the effect of returning each symbol to its original form. The information to be communicated is thereby preserved.

The exact low pass characteristic of the transmission line depends in part on the specific media used and in part on the length of the transmission line. So, if these factors vary within a particular application of a communications system, the transmission line equalizer will have to be able to adapt to these differences in order to correctly compensate for the effect of the transmission line on the signal.

It is important that the transmission line equalizer provides just the right amount of compensation to avoid under-compensation (the failure to remove some residual inter-symbol interference that continues to cause the loss of or incorrect communication of information) or over-compensation (noise enhancement and distortion of the symbols that causes the loss of or incorrect communication of information).

As those of ordinary skill in the art will recognize, the frequency response of any system can be expressed by a polynomial equation referred to as the transfer function of the system. This equation often takes the shape of a fraction with the numerator having one polynomial expression and the denominator having another. The roots of the numerator are referred to as zeros and the roots of the denominator are referred to as poles. These roots correspond to the corner frequencies of the system and can be manipulated by a designer to create a transfer function having a desired frequency response.

In the case of a communications system, the transmission line exhibits one transfer function and the transmission line equalizer attempts to exhibit the exact inverse of that transfer function in order to compensate for the effect of the transmission line on the communicated signal.

In order to achieve successful compensation, two general steps must be accomplished. First, the frequency response of the transmission line must be either determined empirically (i.e., by measurement) or approximated theoretically. Since empirical determination is often cost prohibitive, theoretical approximation is generally the method used. The accuracy of such an approximation will depend in part on the specific media used and the length of the transmission line. Second, the inverse of the frequency response of the transmission line must be exhibited by the transmission line equalizer as configured by the designer. This is accomplished by manipulating the number and location of the roots, poles and zeros of the transfer function of the transmission line equalizer until the desired frequency response is achieved. As noted above, the accuracy of the approximation of the frequency response of the transmission line depends on the specific media used and the length of the transmission line. Hence, the transmission line equalizer should be designed to adapt to changes in either of these factors to assure successful compensation for the signal.

The frequency response of a UTP or STP transmission line due to or dominated by skin effect is usually approximated as having a roll off of 10 dB per decade (10 db/dec).

As discussed before, using this approximation a transmission line equalizer would have to exhibit the inverse frequency response of the transmission line to compensate correctly for the presumed frequency response of the transmission line. Unfortunately, each zero in a transfer function provides a gain of 20 dB/dec above the corner frequency of that zero. This is obviously too much by itself. What is needed is a transfer function with about "half" of the gain of one zero, i.e. 10 dB instead of 20 dB. The prior art has adopted two approaches to reduce this response to more closely approximate the inverse frequency response of the typical transmission line.

The first prior art approach is to design the transmission line equalizer with a pole/zero pair and place the pole at a higher frequency than the zero. The addition of the pole has the effect of partially canceling the gain of the zero. The intended result is for the modified transfer function to have a slope of 10 dB/dec in the frequency range of interest (i.e., the frequency range of the signals to be transmitted over the transmission line).

For an adaptive design, the frequency separation between the pole and zero can be varied to adjust the frequency response of the transmission line equalizer to better match that of the transmission line whatever the specific media used or the length of the transmission line.

FIG. 1A is a representation of a transfer function H(s) where s represents the complex frequency, z is the zero frequency (rad/sec) of the transfer function, and p is the pole frequency (rad/sec) of the transfer function where z is less than p.

FIG. 1B is a plot showing the frequency response of the transfer function H(s) of FIG. 1A. The vertical axis is gain in db (20 log|H(jω)|), the horizontal axis is angular frequency, ω, in radians per second. The dashed curve is an asymptote of the transfer function H(s). The solid curve is a plot of the transfer function H(s).

The second prior art approach is to add an "all pass" function to a high pass function. An "all pass" function transmits all frequency components of the signal. The addition of the all pass function to the high pass function has the effect of producing a weighted average of the two functions with less high frequency gain than that of the high pass function alone.

The high pass function can have any number of zeros. Recall that one zero produces a gain of 20 dB/dec. This is true of each zero in the function. So at frequencies above the highest corner frequency, a high pass function that has n zeros would exhibit a gain of n×20 dB/dec.

For an adaptive design, the mixture in the addition function can be varied to adjust the frequency response of the transmission line equalizer to better match that of the transmission media whatever the specific media used or the length of that media. One technique used to vary the mixture is to multiply the output of the high pass function by a selectable constant.

FIG. 2A is a representation of a transfer function E(s) where s represents the complex frequency. $H_1(s)$ is a high pass transfer function (shown as a second order function specifically here), $\omega_n$ is the natural frequency of $H_1(s)$, $\xi$ is the damping factor of $H_1(s)$, k is the variable gain (between 0 and 1) fitted to the transmission line type and length.

FIG. 2B is a plot of gain versus frequency for four curves A, B, C and D. Curve A is a constant unity gain function. Curve B is the frequency response of $H_1(s)$. Curves C and D are two different equalizer response curves corresponding to gain value $k_1$ and $k_2$, respectively, where $k_1 > k_2$.

As can be seen, adjusting $k_1$ in transfer function E(s) between 0 and 1 allows the slopes of curves C and D to be adjusted as desired.

The transmission line equalizers that result from either of the two prior art approaches above can only provide a moderate approximation of the transfer function needed to compensate for the frequency response of the transmission lines in certain specific applications. This is due to inaccuracies in the model used to approximate the frequency response of the transmission media.

One specific application where the prior art transmission line equalizers provide only a rough approximation of the transfer function needed to compensate for the frequency response of the transmission media is for Fast Ethernet Local Area Network (LAN) applications referred to as 100BaseT4 designed to IEEE Standard 802.3u-1995 Clause 23. This is due in part to the wide frequency spread and in part to the advanced coding scheme of the 100BaseT4 standard. The resulting mismatch between the transmission line and the transmission line equalizer degrades the receiver performance to such an extent that it limits the achievable transmission speed and distance.

OBJECTS AND ADVANTAGES OF THE INVENTION

Accordingly, it is an object and advantage of the present invention to provide a transmission line model that more closely approximates the frequency response of actual transmission lines.

It is a further object and advantage of the present invention to provide a transmission line equalizer that more closely exhibits a transfer function that compensates for the frequency response of a transmission line.

It is a further object and advantage of the present invention to provide a transmission line equalization circuit which adaptively compensates for the frequency response of a transmission line.

Yet a further object and advantage of the present invention is to provide an improved method of compensating for the frequency response of a transmission line.

These and many other objects and advantages of the present invention will become apparent to those of ordinary skill in the art from a consideration of the drawings and ensuing description of the invention.

SUMMARY OF THE INVENTION

The present invention is a method and apparatus for equalizing the frequency response of a transmission line. The method includes the steps of modeling the frequency response of the transmission line for a predetermined frequency range to a predetermined accuracy; determining a desired equalizer response by taking an inverse of the modelled frequency response of the first step; implementing an equalizer that exhibits the desired response; and utilizing the equalizer to equalize the frequency response of the transmission line. The apparatus includes an adaptive equalizer circuit which includes a plurality of signal processor circuits which each take an input signal from the transmission line and process it to mimic a term in a transfer function which represents an inverse of the transfer function of the transmission line. The signals from these processors are then summed and multiplied by a programmable gain term. Then the input is added to the output of the multiplier to form an output equalizer signal. The programmable gain term is adapted to cause the signal at the output to closely approximate a predetermined high frequency signal peak value through a send loop mechanism.

where $\omega$ is 1/RC and s is the complex frequency. R is the value of the resistance of MOS transistor 64 and C is the value of the capacitance denoted at 70.

Figure 4A:
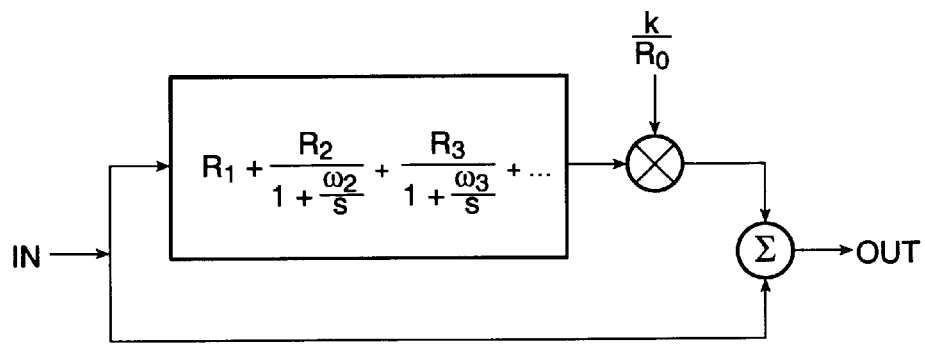
FIG. 4A is a representation of a transfer function which is the inverse of a transmission line transfer function where a number of terms are utilized and summed to approximate the desired transfer function as shown. The $R_0$ term represents the characteristic impedance of the transmission line, the $R_1$ through $R_N$ terms represent attenuation due to skin effect in the transmission line. The k term is proportional to the length of the transmission line and $\omega_2$ through $\omega_n$ are the set of corner frequencies representative of frequencies where the skin effect increases in a particular model.
Figure 4B:
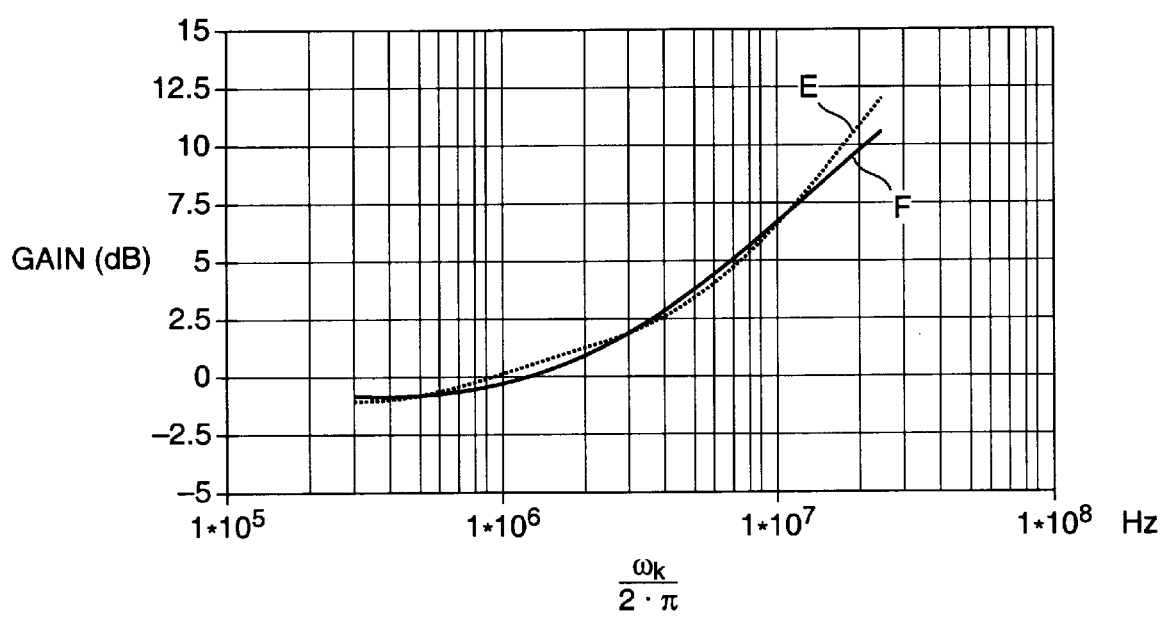
FIG. 4B is a plot of gain (dB) versus frequency (Hz) showing a pair of curves E and F. Curve E is a dashed line and represents the inverse of the measured frequency response of a 100 meter length of category 3 UTP, i.e., what the equalizer response should be. Curve F, the solid line, represents a modelled equalizer transfer function using a model as shown in FIG. 4A to closely approximate an ideal equalizer.
Figure 8:
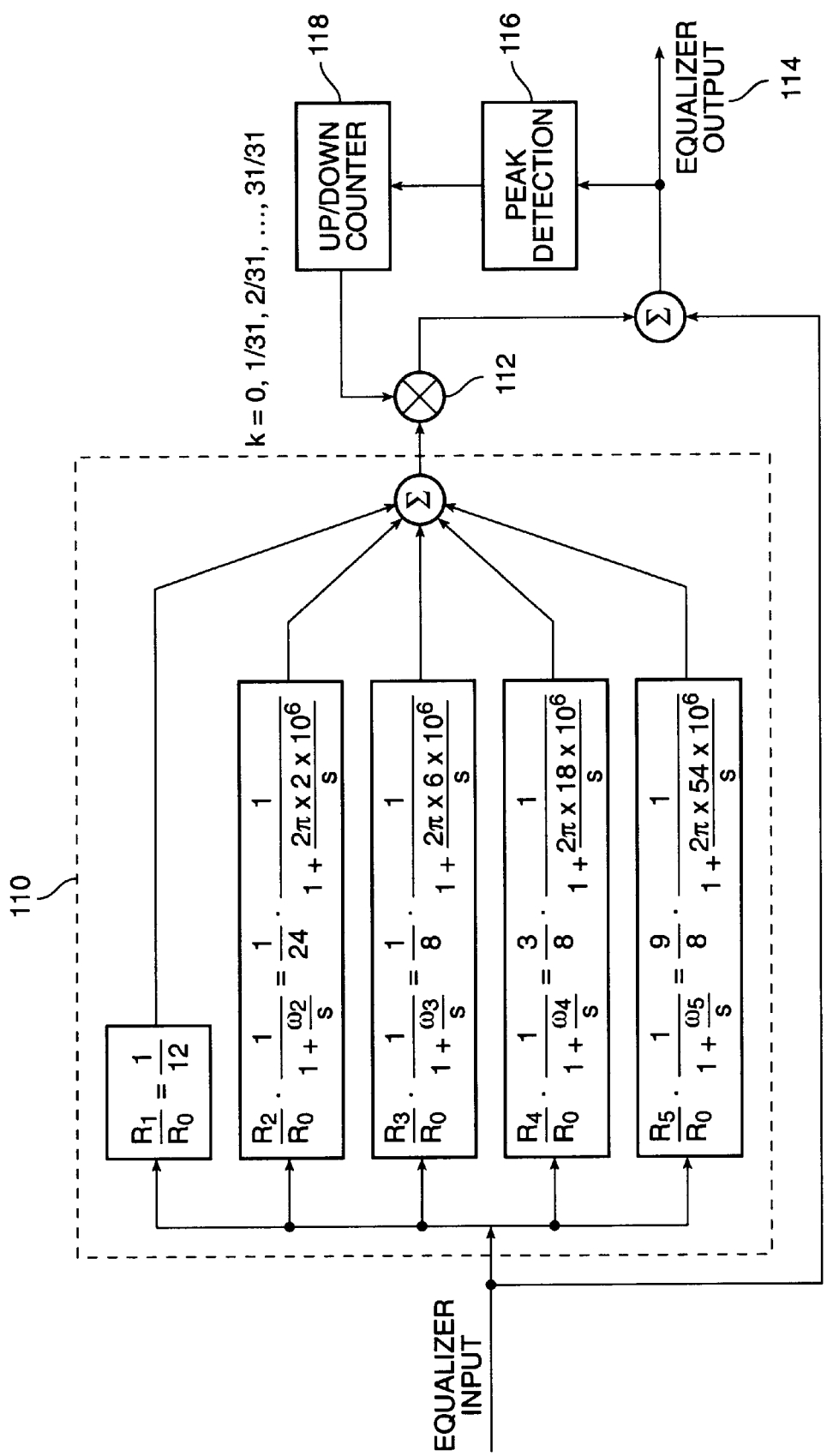

FIG. 8 is a block diagram showing an equalizer apparatus implementing the transfer function described in FIGS. 4A and 4B.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

The present invention is a method and apparatus for equalizing the frequency response of a transmission line. The method includes the steps of modeling the frequency response of the transmission media for a predetermined frequency range to a predetermined accuracy; determining a desired equalizer response by taking an inverse of the modelled frequency response of the first step; implementing an equalizer that exhibits the desired response; and utilizing the equalizer to equalize the frequency response of the transmission line. The apparatus includes an adaptive equalizer circuit which includes a plurality of signal processor circuits which each take an input signal from the transmission line and process it to mimic a term in a transfer function which represents an inverse of the transfer function of the transmission line. The signals from these processors are then summed and multiplied by a programmable gain term. Then the input is added to the output of the multiplier to form an output equalizer signal. The programmable gain term is adapted to cause the signal at the output to closely approximate a predetermined high frequency signal peak value through a send loop mechanism.

Transmission Line Model

Figures 1A, 1B:
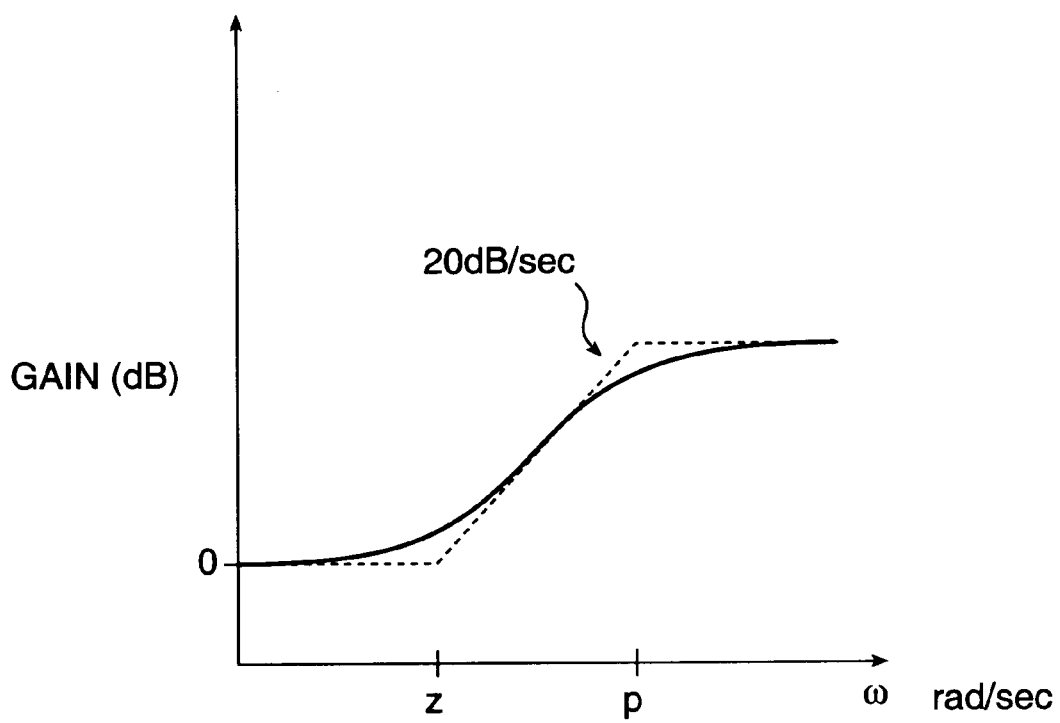
FIG. 1A is a representation of a transfer function H(s) where s represents the complex frequency, z is the zero frequency (rad/sec) of the transfer function and p is the pole frequency (rad/sec) of the transfer function above.
FIG. 1B is a plot showing the frequency response of the transfer function H(s). The vertical axis is gain in db (20 log|H(jω)|), the horizontal axis is angular frequency, ω, in radians per second. The dashed curve is an asymptote of the transfer function H(s). The solid curve is a plot of the transfer function H(s).
Figure 2A:
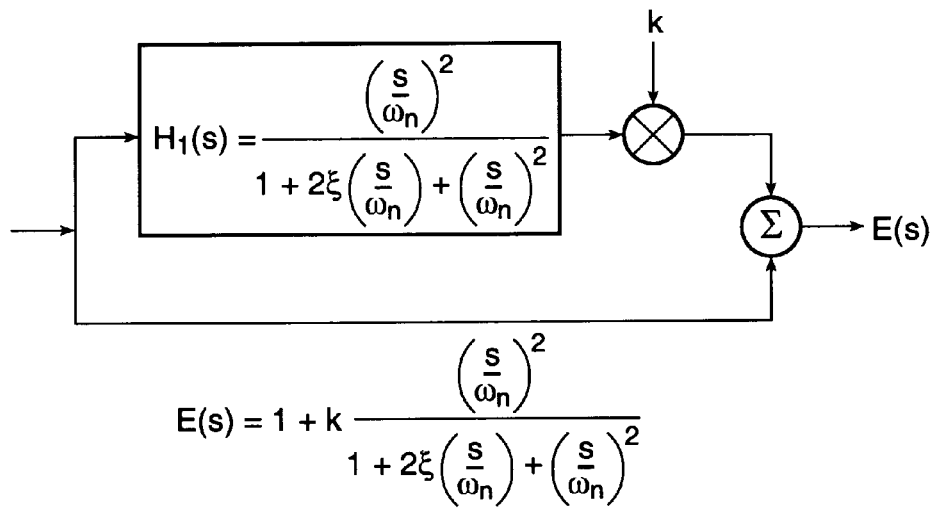
FIG. 2A is a representation of a transfer function E(s) where s represents the complex frequency. $H_1(s)$ is a high pass transfer function (shown as a second order function specifically here), $\omega_n$ is the natural frequency of $H_1(s)$, $\xi$ is the damping factor of $H_1(s)$, k is the variable gain (between 0 and 1) fitted to the transmission line type and length.
Figure 2B:
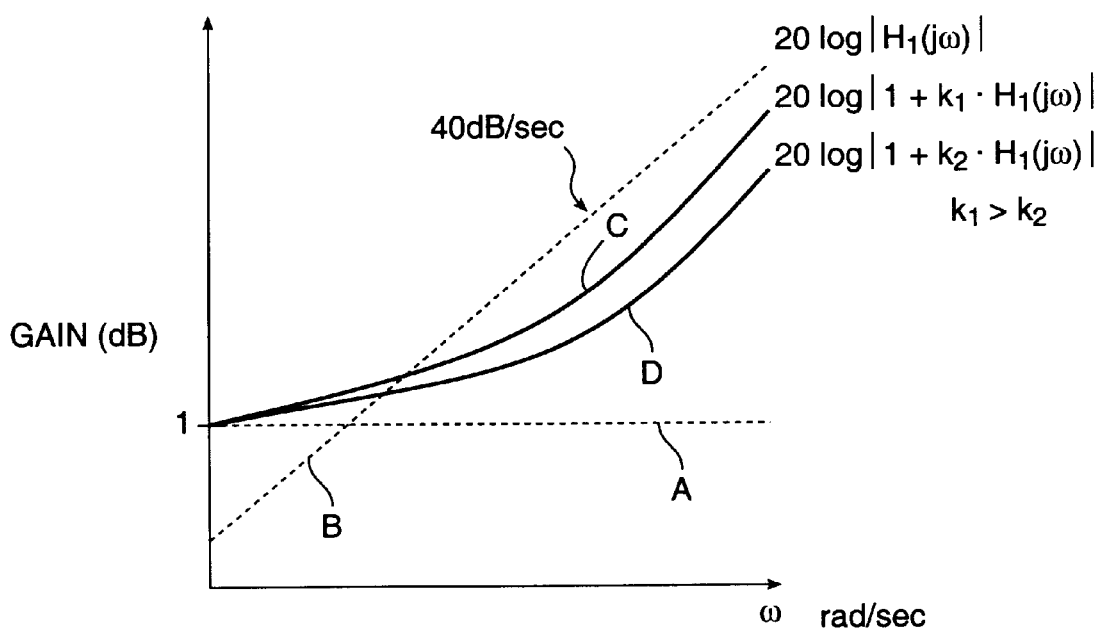
FIG. 2B is a plot of gain versus frequency for four curves A, B, C and D. Curve A is a constant unity gain function. Curve B is the frequency response of $H_1(s)$. Curves C and D are two different equalizer response curves corresponding to gain value $k_1$ and $k_2$, respectively, where $k_1 > k_2$.
Figure 3:
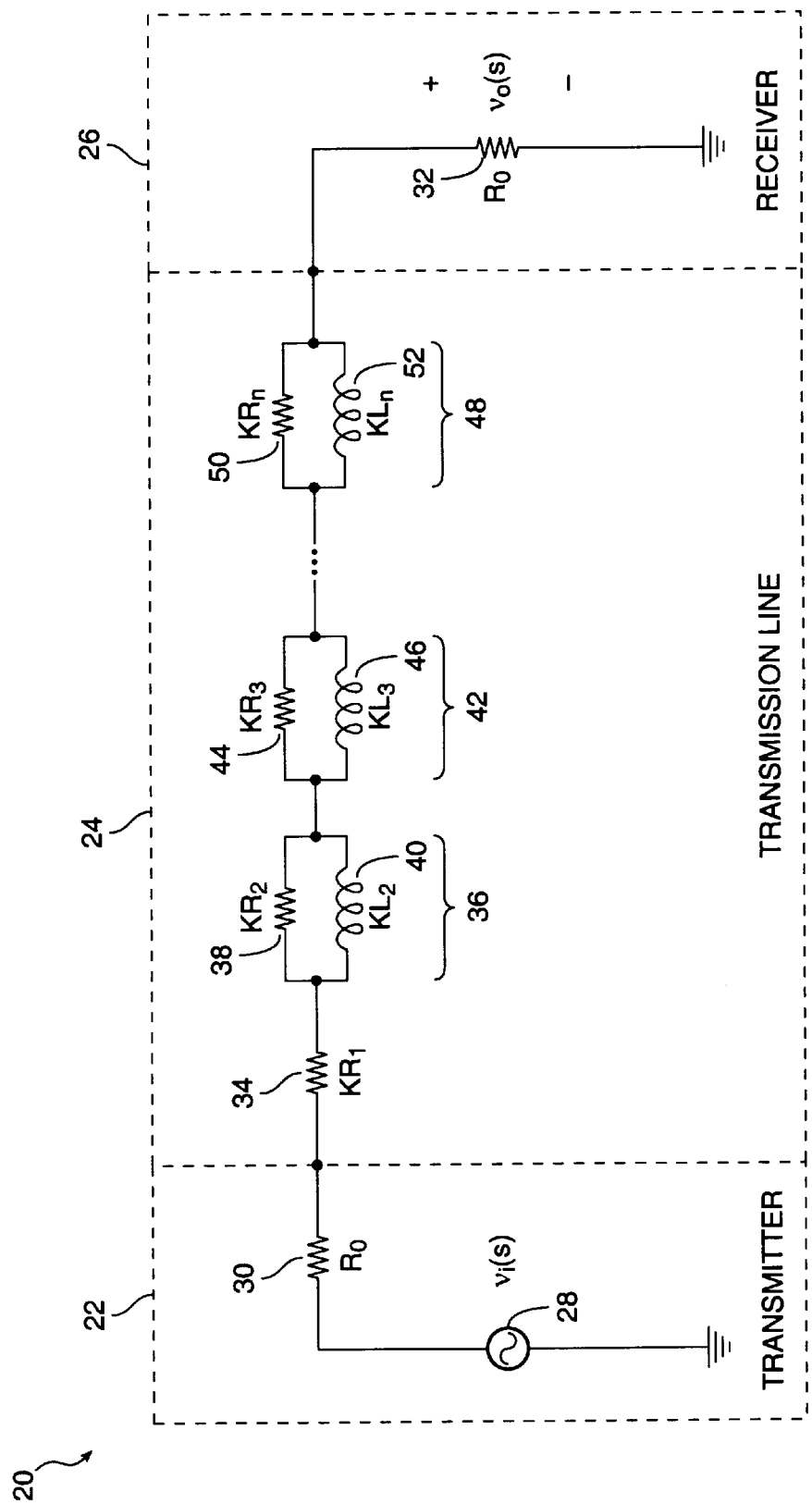
FIG. 3 is a representation of a model of a communications system comprising a transmitter, a transmission line and a receiver.

Turning now to FIG. 3, a circuit diagram of a theoretical model of a communications system 20 is shown. The communications system 20 is made up of models of a transmitter 22, a transmission line 24, and a receiver 26 connected in series. A signal to be communicated is generated by the transmitter 22, carried by the transmission media 24, and received and demodulated by the receiver 26.

The transmitter 22 is modeled as a voltage source 28 and a source resistance 30. The input voltage has a form of $v_i(s)$. The source resistance 30 has a value of $R_0$.

The receiver 26 is modeled as a load resistor 32. The load resistance 32 also has a value of $R_0$. As those of ordinary skill in the art will realize, the source resistance 30 and the load resistance 32 are designed to be matched to reduce signal reflections. The output voltage of the system is the voltage drop across the load resistor 32 and has the form of $v_o(s)$.

As those of ordinary skill in the art will realize, cable loss in most wired transmission media such as coax, UTP and STP results from a skin effect where electrical conduction is limited to the surface area, rather than the whole cross section, of the conductor at higher frequencies. This causes the series impedance and thus the insertion loss to increase with frequency.

In order to properly model the transmission line frequency response, one must take into account that the impedance of the transmission line changes with frequency. In accordance with the present invention, the transmission line frequency response is modelled with a plurality of elements or terms. In FIG. 3, they are shown as a plurality of "taps" 36, 42, 48, each including a resistance and inductance wired in parallel. In FIG. 8, five such terms are used to form an equalizer as shown. For a transmission line which will be used to transmit signals over a given frequency range of interest, a number of "taps" will preferably be used to approximate a series of frequency bands within the range of interest. The number of parallel taps and the values of the components within each tap depend on the frequency range that is of interest and the degree of accuracy that is desired. The number of parallel taps can vary from as few as one up to any number that is desired. In general, it is the case that, the greater the frequency range and the greater the accuracy, the greater the number of taps required.

The transmission line 24 is modeled according to the present invention as several elements in series. The first element is a resistance tap 34. This represents the zero frequency (i.e. DC) or ohmic loss of the transmission line 24. The resistance tap 34 has a general value of $kR_1$ where k is a scaling factor that is proportional to the length of the transmission media 24.

The remaining elements in the model of the transmission line 24 are parallel taps. The first parallel tap 36 consists of resistor 38 and inductor 40 where the resistor 38 has a value of $kR_2$ and the inductor 40 has a value of $kL_2$. The second parallel tap 42 consists of resistor 44 and inductor 46 where the resistor 44 has a general value of $kR_3$ and the inductor 46 has a general value of $kL_3$. The final parallel tap 48 is designated as the nth parallel tap and consists of resistor 50 and inductor 52 where the resistor 50 has a general value of $kR_n$ and the inductor 52 has a general value of $kL_n$. As noted above, the number of parallel taps can vary from as few as one up to any number that is desirable. As a result, n can be any positive integer desirable.

The corner frequency of each tap 36, 42, and 48 is of the form $\omega_c = R/L$ while the insertion loss caused by each tap is of the form kR which depends on the length of the transmission line. Note that the cable loss for a given frequency is modelled by the total insertion loss for all of the taps with corner frequencies lower than the given frequency.

The resulting transfer function which models the cable loss as a function of frequency takes the form of $$\frac{v_o(s)}{v_i(s)} = \frac{1}{2 + \left(\frac{k}{R_0}\right)\left[R_1 + \left(\frac{R_2 s}{(s+\omega_2)}\right) + \left(\frac{R_3 s}{(s+\omega_3)}\right) + \cdots + \left(\frac{R_n s}{(s+\omega_n)}\right)\right]} \quad (1)$$

where $\omega_2 = R_2/L_2$, $\omega_3 = R_3/L_3$, and $\omega_n = R_n/L_n$.

Transmission Line Equalizer Response

Based on this approximation, a cable equalizer has to exhibit the inverse of Equation 1 for proper compensation. The resulting transfer function which models the cable equalizer as a function of frequency takes the form of $$\frac{v_i(s)}{v_o(s)} = 2 + \left(\frac{k}{R_0}\right)\left[R_1 + \left(\frac{R_2 s}{(s+\omega_2)}\right) + \left(\frac{R_3 s}{(s+\omega_3)}\right) + \cdots + \left(\frac{R_n s}{(s+\omega_n)}\right)\right] \quad (2)$$

where $\omega_2 = R_2/L_2$, $\omega_3 = R_3/L_3$, and $\omega_n = R_n/L_n$.

Those of ordinary skill in the art will recognize Equation 2 as an all pass function that is added to a high pass function. Also, each of the taps 36, 42, and 48 are represented as high pass functions of the form $R_s/(s+\omega_c)$. The overall transfer function can be implemented using a summation approach.

FIG. 4A is a representation of a transfer function which is the inverse of a transmission line transfer function where a number of terms are utilized and summed to approximate the desired transfer function as shown. The $R_0$ term represents the characteristic impedance of the transmission line, the $R_1$ through $R_N$ terms represent attenuation due to skin effect in the transmission line. The k term is proportional to the length of the transmission line and $\omega_n$ is the set of corner frequencies representative of frequencies where the skin effect increases in a particular model.

FIG. 4B is a plot of gain (dB) versus frequency (Hz) showing a pair of curves E and F. Curve E is a dashed line and represents the inverse of the measured frequency response of a 100 meter length of category 3 UTP, i.e., what the equalizer response should be. Curve F, the solid line, represents a modelled equalizer transfer function using a model as shown in FIG. 4A to closely approximate an ideal equalizer.

Transmission Line Equalizer Design

Figure 5:
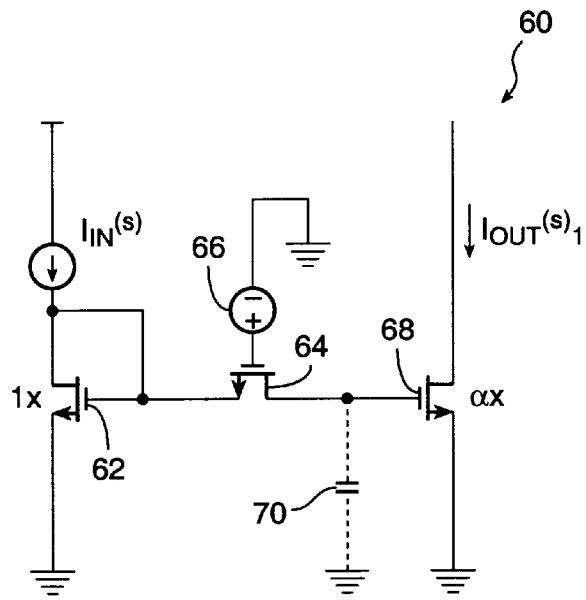
FIG. 5 is an electrical schematic diagram showing a low pass "tap" implementation according to a presently preferred embodiment of the present invention.
Figure 6:
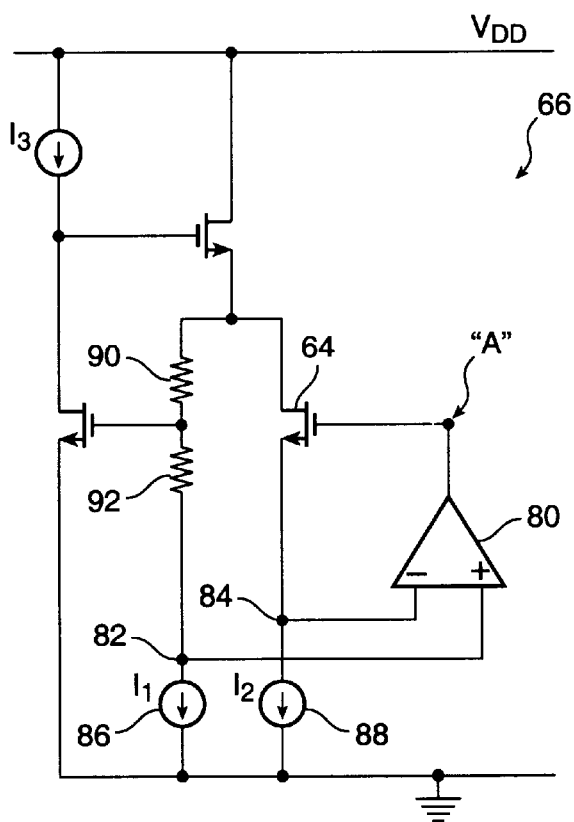
FIG. 6 is an electrical schematic diagram showing a servo loop for generating the control voltage applied to the gate of MOS transistor 64 (FIG. 5) to bias the transistor to act like a precision resistor.
Figure 7:
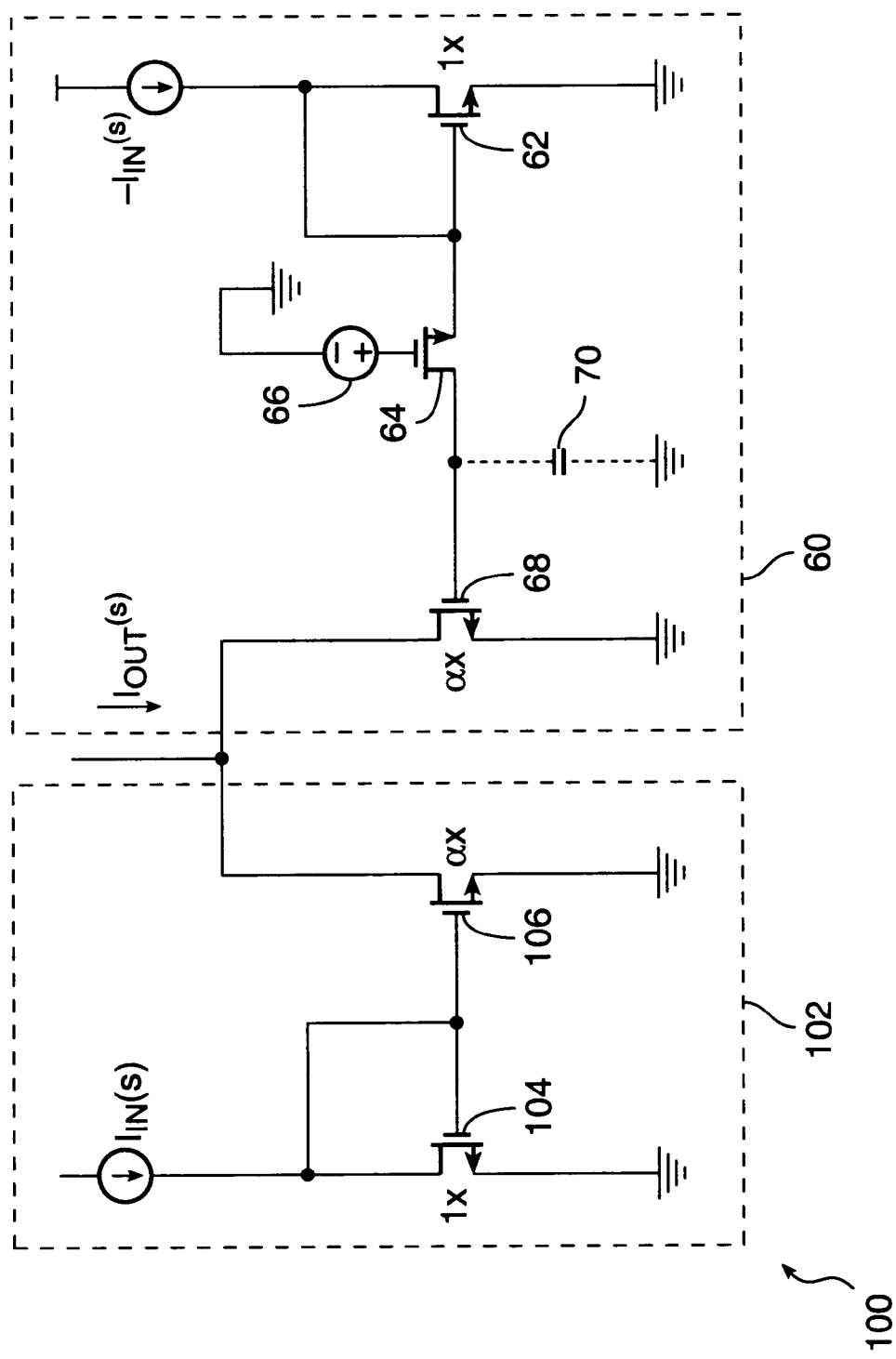
FIG. 7 is an electrical schematic diagram showing on the left an all pass function with a gain of "x" and on the right a low pass function with signal inversion corresponding to a transfer function of $$-\frac{1}{1+\frac{\omega}{s}}$$

Circuit diagrams showing a tap implementation according to the present invention are shown in FIGS. 5, 6 and 7. As those of ordinary skill in the art will recognize, for tap frequencies in the megahertz and tens of megahertz range, it is desirable to process the signal to be compensated in the current domain so that one can do away with bandwidth limiting high impedance nodes along the signal path. Consequently, this is the preferred method of implementation.

Turning now to FIG. 5, a circuit diagram showing a low pass tap 60 according to the present invention is shown. The low pass tap 60 has a first MOS transistor 62 that has the drain tied to the gate and the source tied to ground to form a diode. The gate of the first MOS transistor 62 is also tied to the source of a MOS resistor 64. The gate of the MOS resistor 64 is tied to a control voltage source 66 which provides a variable DC voltage to set the resistance of MOS resistor 64. The drain of the MOS resistor 64 is tied to the gate of a second MOS transistor 68. The source of the second MOS transistor 68 is tied to ground.

The low pass tap 60 uses the inherent capacitance between the gate and the source of the second MOS transistor 68 and the resistance of the MOS resistor (or transistor) 64 to determine the corner frequency which is of the general form $\omega_c = 1/RC$. If the second MOS transistor 68 does not have the correct capacitance value desired, a capacitor 70 (shown in phantom) can be added between the gate of the second MOS transistor 68 and ground to adjust the capacitance.

The corner frequency of the low pass tap 60 can also be manipulated by changing the resistance of the MOS resistor 64. The resistance of the MOS resistor 64 depends on the magnitude of the control voltage applied to the gate and the aspect ratio of the resistor itself. So, changing the resistance of the MOS resistor 64 can be done in either or both of two ways. First, the value of the control voltage source 66 can be varied. An increase in the voltage results in a decrease in the resistance and vice versa. Second, the aspect ratio of the resistor itself could be changed. One simple method of accomplishing this in an integrated circuit implementation is to fabricate a plurality of identical MOS resistors on a common substrate and connect them in series or parallel with on chip switching until the desired resistance is achieved.

A presently preferred method of changing the resistance of the MOS resistor 64 is outlined below with respect to FIG. 6.

The resulting transfer function of the low pass tap 60 takes the simplified form of $$\frac{I_{out}(s)}{I_{in}(s)} = \alpha \frac{1}{1+sRC} = \alpha \frac{\omega}{(s+\omega)} \quad (3)$$

where $\omega = 1/RC$.

Turning now to FIG. 6, a circuit diagram showing a servo loop for MOS resistor control according to the present invention is shown. The servo loop is used in place of the control voltage source 66 of FIG. 5 to control the MOS resistor 64 of FIG. 5 and the output at node "A" is the desired voltage on the gate of the MOS resistor 64.

Amplifier 80 forces node 82 and node 84 to have the same voltage. A first current source 86 has a value of $V_{REF}/R_{INT}$. A second current source 88 has a value of $V_{REF}/R_{EXT}$ where $R_{EXT}$ is a precision resistor (not shown). A first resistor 90 and a second resistor 92 are connected in series and have a combined resistance value of $aR_{INT}$ where "a" is a constant. So, the MOS resistor 64 is biased with a voltage drop equal to $(aR_{INT})(V_{REF}/R_{INT})$ or $aV_{REF}$. Since the current through MOS resistor 64 is $V_{REF}/R_{EXT}$, the equivalent resistance of the MOS resistor 64 is $(aV_{REF})/(V_{REF}/R_{EXT})$ or $aR_{EXT}$.

This servo loop allows the integrated circuit designer to choose the value of the MOS resistor 64 by changing the aspect ratio of the MOS resistor 64 and the value of the series resistors 90 and 92 and have the resulting value of the MOS resistor 64 (i.e. $aR_{EXT}$) depend directly on $R_{EXT}$ which can be tightly controlled. The manufacturing techniques for the MOS resistor 64 and the series resistors 90 and 92 are less precise and could result in unwanted variations in resistance values.

Turning now to FIG. 7, a circuit diagram showing a high pass tap 100 according to a presently preferred embodiment of the present invention is shown. The high pass tap 100 is formed by the summation of an all pass function 102 and the low pass function 60 (FIG. 5) with the input current polarity reversed.

The all pass function 102 consists of a first MOS transistor 104 that has the drain tied to the gate and the source tied to ground as a diode. The gate of the first MOS transistor 104 is also tied to the gate of a second MOS transistor 106. The source of the second MOS transistor 106 is tied to ground as a current mirror.

The all pass function 102 and the low pass function 60 are combined by tying the drain of MOS transistor 106 to the drain of MOS transistor 68. The resulting transfer function of the high pass tap 100 takes the form of $$\frac{I_{out}(s)}{I_{in}(s)} = \alpha - \alpha \frac{1}{1+sRC} = \alpha \frac{s}{(s+\omega)} \quad (4)$$

where $\omega=1/RC$.

Recall in the above discussion of the model of the transmission line 24 of FIG. 3 and the resulting transmission line equalizer response given in Equation 2 that each of the taps 36, 42, and 48 of FIG. 3 are represented as high pass functions in Equation 2 having the form $Rs/(s+\omega_c)$. This is the same form as Equation 4. Therefore, the high pass tap 100 of FIG. 7 could be used as a circuit implementation of each of the taps 36, 42, and 48 of FIG. 3 and Equation 2.

The transfer function of Equation 2 as shown in FIG. 4 can therefore be implemented as a circuit by first forming the high pass function as a circuit with an output, multiplying the output by a programmable gain, and adding an all pass function to achieve an equalizer output. The design can then be made adaptive by having the programmable gain selected based upon measured response of the transmission line.

According to the present invention, the high pass function of Equation 2 as shown in FIG. 4A can be implemented as a circuit by connecting a resistance tap having a value equal to that of the ohmic loss of the transmission media in series with a number of parallel taps containing the high pass tap 100 of FIG. 7. The number of parallel taps and the values of the components within each tap depend on the frequency range that is of interest and the degree of accuracy that is desired as discussed above.

The resistance tap can be implemented in any number of ways that are known to those of ordinary skill in the art. According to the present invention, the resistance tap is implemented as a circuit similar to that of the all pass tap 102 of FIG. 7.

The all pass function and the summation circuit can be of ordinary design that is well known to those of ordinary skill in the art. For an adaptive design, the multiplication circuit can also be of ordinary design.

The selection of the value of the programmable gain can be accomplished in any number of ways which are also well known to those of ordinary skill in the art. The presently preferred method of selecting the programmable gain is outlined below with respect to FIG. 8 which exhibits a transfer function of the form of the transmission line equalizer transfer function of Equation 2 and can be used to compensate for the frequency response of the transmission line.

Turning now to FIG. 8, a transfer function of a transmission line equalizer according to the present invention is shown with a high pass function that has four taps. In this case, the corner frequencies of the high pass function 110 have been chosen to be $\omega_2=1/R_2C_2=2\pi(2\times10^6)$, $\omega_3=1/R_3C_3=2\pi(6\times10^6)$, $\omega_4=1/R_4C_4=2\pi(18\times10^6)$, and $\omega_5=1/R_5C_5=2\pi(54\times10^6)$ rad/sec.

These corner frequencies are one possible choice for a transmission line equalizer for a Fast Ethernet LAN device referred to as 100BaseT4 designed to IEEE Standard 802.3u-1995 Clause 23. Under this standard, the transmission media for each channel is a STP or UTP of Category 3 or better having a characteristic impedance of 100 Ω and a maximum length of 100 m. The frequency range of interest is from 0 to 25 MHz.

Also shown in block diagram form in FIG. 8 is one means of selecting the value of the programmable gain of the multiplier 112. Recall that this is what makes the transmission line equalizer design adaptive. First, the signal at the equalizer output 114 is processed by a peak detector 116. Then the peak detector 116 compares the signal peak against a reference to determine if the signal peak is within a specified range of the reference. If the signal peak is within the specified range, then the transmission line equalizer is providing proper compensation and the programmable gain is left unchanged.

When the signal peak exceeds the specified range, the peak detector 116 sends a signal to decrement an up/down counter 118. The up/down counter 118 in turn decreases the programmable gain of the multiplier 112. This results in a decreased amount of compensation from the transmission line equalizer.

When the signal peak falls below the specified range, the peak detector 116 sends a signal to increment an up/down counter 118. The up/down counter 118 in turn increases the programmable gain of the multiplier 112. This results in an increased amount of compensation from the transmission line equalizer.

Through the repeated application of this process, the frequency response of the transmission line equalizer can be adjusted to better match that of the transmission media whatever the specific media used or the length of that media.

If the signal at the equalizer output contains data pulses that vary in width, then the means of selecting the value of the programmable gain of the multiplier 112 can be improved by detecting the peak level of only the narrow pulses rather than the absolute peak of all pulses.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method for compensating for the frequency response of a transmission ine, said method comprising the steps of:
   modelling the frequency response of the transmission line for a predetermined frequency range to a predetermined accuracy as an ohmic loss in series with at least one parallel tap consisting of an inductor and resistor wired in parallel;
   determining a desired transmission line equalizer response from an inverse of the modelled frequency response;
   forming a transmission line equalizer that exhibits the desired transmission line equalizer response; and
   connecting the transmission line equalizer to the transmission line.

2. A method of compensating for a frequency response of a transmission line comprising the steps of:
   modeling the frequency response of the transmission media for a predetermined frequency range to a predetermined accuracy as an ohmic loss in series with at least one parallel tap consisting of an inductor and a resistor in parallel;
   determining a desired transmission line equalizer response from an inverse of the modelled frequency response;

designing a transmission line equalizer that exhibits the desired transmission line equalizer response; and employing the transmission line equalizer to compensate for the frequency response of the transmission line.

3. The method of claim 2 wherein the transmission line has a finite length and the ohmic loss and the at least one parallel tap are each proportional to the length of the transmission line.

4. A method of compensating for a frequency response of a transmission line comprising the steps of:

modeling the frequency response of the transmission media for a predetermined frequency range to a predetermined accuracy as an ohmic loss in series with at least one parallel tap consisting of an inductor and a resistor in parallel:

determining a desired transmission line equalizer response from an inverse of the modeled frequency response;

designing a transmission line equalizer that exhibits the desired transmission line equalizer response;

employing the transmission line equalizer to compensate for the frequency response of the transmission line;

wherein the transmission line has a finite length and the ohmic loss and the at least one parallel tap are each proportional to the length of the transmission line; and wherein the step of designing the transmission line equalizer comprises the step of implementing the at least one parallel tap as a first all pass function means minus a low pass function means.

5. The method of claim 4 wherein the all pass function means comprises:

a current source having an input and an output wherein the input is tied to a positive voltage potential;

a first MOS transistor having a drain, a gate, and a source; and a second MOS transistor having a drain, a gate, and a source wherein the drain of the first MOS transistor is tied to each of the gate of the first MOS transistor, the gate of the second MOS transistor, and the output of the current source and the source of the first MOS transistor and the source of the second MOS transistor are both tied to ground.

6. The method of claim 5 wherein the low pass function means comprises:

a current source having an input and an output wherein the input is tied to a positive voltage potential;

a third MOS transistor having a drain, a gate, and a source wherein the source is tied to ground;

a fourth MOS transistor having a drain, a gate, and a source wherein the source is tied to ground;

a control voltage source having a positive terminal and a negative terminal wherein the negative terminal is tied to ground; and a MOS Resistor having a drain, a gate, and a source wherein the drain of the third MOS transistor is tied to each of the output of the current source, the gate of the third MOS transistor, and the source of the MOS Resistor, the gate of the MOS Resistor is tied to the positive terminal of the control voltage source, and the drain of the MOS Resistor is tied to the gate of the fourth MOS transistor.

7. The method of claim 6 wherein the low pass function means further comprises a capacitor tied between the gate of the fourth MOS transistor and ground.

8. The method of claim 6 wherein the MOS Resistor has a constant effective aspect ratio and the control voltage source applies a select DC potential to achieve a select resistance value for the MOS Resistor.

9. The method of claim 6, wherein the control voltage source applies a constant DC potential and the MOS Resistor has an effective aspect ratio which is changeable to achieve a select resistance value for the MOS Resistor.

10. The method of claim 9 wherein the resistance of the MOS Resistor is changed by placing a plurality of identical MOS Resistors in series.

11. The method of claim 9 wherein the resistance of the MOS Resistor is changed by placing a plurality of identical MOS Resistors in parallel.

12. The method of claim 6 wherein the control voltage source of the low pass function means comprises:

an amplifier having a negative input, a positive input, and an output wherein the negative input is tied to the source of the MOS Resistor of the low pass function means and the output is connected to the gate of the MOS Resistor;

a first MOS transistor having a drain, a gate, and a source wherein the drain is connected to a positive DC potential;

a second MOS transistor having a drain, a gate, and a source wherein the source is tied to ground;

a first resistor having a first end and a second end wherein the first end is connected to both the drain of the MOS Resistor and the source of the first MOS transistor;

a second resistor having a first end and a second end wherein the first end is connected to both the second end of the first resistor and the gate of the second MOS transistor;

a first current source having an input and an output wherein the input is tied to the positive DC potential and the output is tied to both the gate of the first MOS transistor and the drain of the second MOS transistor;

a second current source having an input and an output wherein the input is tied to both the second end of the second resistor and the positive input of the amplifier and the output is tied to ground; and a third current source having an input and an output wherein the input is tied to both the source of the MOS Resistor and the negative input of the amplifier and the output is tied to ground.

13. The method of claim 6 wherein the step of designing the cable equalizer further comprises the steps of:

connecting in series the at least one parallel tap and a resistor tap having a value equal to that of the ohmic loss of the transmission media to form a combination high pass function means; and summing the combination high pass function means with a second all pass function means to create the cable equalizer response.

14. The method of claim 13 wherein the combination high pass function means has an input and an output and the step of designing the cable equalizer further comprises the steps of:

connecting a multiplication circuit which has a variable magnitude that is proportional to the length of the transmission media in series with the output of the combination high pass function means; and controlling the variable magnitude of the multiplication circuit to adapt the cable equalizer response to the frequency response of the transmission media.

15. The method of claim 14 wherein the cable equalizer has an input and an output and the step of controlling the variable magnitude of the multiplication circuit comprises the steps of:

connecting a peak detector circuit to the output of the cable equalizer;

connecting an up/down counter between the peak detector and the multiplication circuit;

sampling the cable equalizer output;

comparing the sample against a preselected standard to determine the existence of one of three conditions in the sample, the three conditions including:

Condition 1: the sample is above a preselected range of the preselected standard;

Condition 2: the sample is within a preselected range of the preselected standard; and Condition 3: the sample is below a preselected range of the preselected standard; and employing the peak detector such that on Condition 1 the up/down counter is decremented to reduce the magnitude of the multiplication circuit, on Condition 2 the up/down counter is left unchanged to maintain the magnitude of the multiplication circuit, and on Condition 3 the up/down counter is incremented to increase the magnitude of the multiplication circuit.

16. The method of claim 15 wherein the cable equalizer output contains both narrow pulses and wide pulses and the step of sampling the cable equalizer output further comprises the steps of:

distinguishing between narrow pulses and wide pulses in the cable equalizer output; and sampling only narrow pulses of the cable equalizer output.

17. The method of claim 15 wherein the transmission media has an input and an output and the step of employing the cable equalizer further comprises the steps of:

obtaining an uncompensated output signal from the output of the transmission media;

feeding the uncompensated output signal into the input of the cable equalizer; and obtaining a compensated output signal from the output of the cable equalizer.

* * * * *